United States Patent
Pan et al.

(10) Patent No.: US 11,881,744 B2
(45) Date of Patent: Jan. 23, 2024

(54) STATOR ASSEMBLY AND METHOD FOR WINDING COILS AROUND THE STATOR ASSEMBLY

(71) Applicant: Zhongshan Broad-Ocean Motor Co., Ltd., Zhongshan (CN)

(72) Inventors: Mingpan Pan, Zhongshan (CN); Sanzeng Liang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 545 days.

(21) Appl. No.: 17/129,969

(22) Filed: Dec. 22, 2020

(65) Prior Publication Data

US 2021/0111593 A1    Apr. 15, 2021

Related U.S. Application Data

(63) Continuation-in-part of application No. PCT/CN2019/105355, filed on Sep. 11, 2019.

(30) Foreign Application Priority Data

Apr. 19, 2019  (CN) .......................... 201910316200.0
Apr. 19, 2019  (CN) .......................... 201920547109.5

(51) Int. Cl.
*H02K 1/14*     (2006.01)
*H02K 1/16*     (2006.01)
(Continued)

(52) U.S. Cl.
CPC ............... *H02K 1/146* (2013.01); *H02K 1/16* (2013.01); *H02K 3/32* (2013.01); *H02K 15/02* (2013.01); *H02K 19/10* (2013.01)

(58) Field of Classification Search
CPC ............ H02K 1/14; H02K 1/146; H02K 1/16; H02K 3/32; H02K 15/02; H02K 19/10
(Continued)

(56) References Cited

U.S. PATENT DOCUMENTS 4,588,143 A * 5/1986 Hetzel ................. H02K 15/085
                                              242/432.5
8,288,903 B2 * 10/2012 Matsuda ................ H02K 3/522
                                              310/43
(Continued)

FOREIGN PATENT DOCUMENTS

CN    203813543 U    9/2014
CN    106602773 A    4/2017
(Continued)

OTHER PUBLICATIONS

Gao et al., English Machine Translation of CN 106602773 (Year: 2017).*

(Continued)

*Primary Examiner* — Rashad H Johnson
(74) *Attorney, Agent, or Firm* — MATTHIAS SCHOLL P.C.; Matthias Scholl

(57) ABSTRACT

A stator assembly includes a strip stator core, a three-phase coil winding, and an end insulator. The strip stator core includes twelve stator core units, twelve connection parts, and twelve slots; every two adjacent stator core units are connected by one of the twelve connection parts; each slot is disposed between every two adjacent stator core units, and each stator core unit includes a yoke and a tooth protruding from one end of the yoke; every two adjacent teeth are abutted against each other to form one of the twelve slots. The three-phase coil winding includes a U-phase winding, a V-phase winding, and a W-phase winding. The end insulator includes a first end insulator and a second end insulator; the first end insulator includes a first coil-in pin, a second coil-in pin, a third coil-in pin, and a coil-out pin.

8 Claims, 13 Drawing Sheets

(51) Int. Cl.
*H02K 3/32* (2006.01)
*H02K 15/02* (2006.01)
*H02K 19/10* (2006.01)

(58) Field of Classification Search
USPC ..................................................... 310/254.1
See application file for complete search history.

(56) References Cited

U.S. PATENT DOCUMENTS

| 2007/0278875 | A1* | 12/2007 | Haga | H02K 3/522 |
| | | | | 310/260 |
| 2015/0311760 | A1* | 10/2015 | Iwasaki | H02K 3/28 |
| | | | | 310/71 |
| 2018/0183282 | A1* | 6/2018 | Aso | H02K 5/24 |
| 2020/0028398 | A1* | 1/2020 | Li | H02K 3/12 |
| 2022/0224183 | A1* | 7/2022 | Lee | H02K 1/148 |

FOREIGN PATENT DOCUMENTS

| CN | 107769421 A | 3/2018 |
| CN | 109904964 A | 6/2019 |
| JP | 2003250252 A | 9/2003 |
| JP | 2006115685 A | 4/2006 |

OTHER PUBLICATIONS

Zhuhai et al., English Machine Translation of CN 107769421 (Year: 2018).*

* cited by examiner

STATOR ASSEMBLY AND METHOD FOR WINDING COILS AROUND THE STATOR ASSEMBLY

CROSS-REFERENCE TO RELAYED APPLICATIONS

This application is a continuation-in-part of International Patent Application No. PCT/CN2019/105355 with an international filing date of Sep. 11, 2019, designating the United States, now pending, and further claims foreign priority benefits to Chinese Patent Application No. 201910316200.0 filed on Apr. 19, 2019, and to Chinese Patent Application No. 201920547109.5 filed on Apr. 19, 2019. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, MA. 02142.

BACKGROUND

The disclosure relates to a stator assembly and a method for winding coils around the stator assembly.

Conventionally, a stator assembly comprises a stator core, an end insulator, and a three-phase coil winding. The stator core comprises a plurality of teeth protruding from one end face of the stator core. A slot is disposed between every two adjacent teeth. The three-phase coil winding is wound on the slots and a plurality of intersections is produced. This may lead to turn-to-turn short circuit between phases.

SUMMARY

The disclosure provides a stator assembly comprising a strip stator core, a three-phase coil winding, and an end insulator. The strip stator core comprises twelve stator core units, twelve connection parts, and twelve slots; every two adjacent stator core units are connected by one of the twelve connection parts; each slot is disposed between every two adjacent stator core units, and each stator core unit comprises a yoke and a tooth protruding from one end of the yoke; every two adjacent teeth are abutted against each other to form one of the twelve slots. The three-phase coil winding comprises a U-phase winding, a V-phase winding, and a W-phase winding. The end insulator comprises a first end insulator and a second end insulator; the first end insulator comprises a first coil-in pin, a second coil-in pin, a third coil-in pin, and a coil-out pin. The first end insulator and the second end insulator are secured to two end faces of the strip stator core, respectively. The three-phase coil winding is wound on the strip stator core.

In a class of this embodiment, the U-phase winding, the V-phase winding, and the W-phase winding are introduced to the strip stator core via the first coil-in pin, the second coil-in pin, and the third coil-in pin, respectively, and leave the strip stator core via the coil-out pin.

In a class of this embodiment, the twelve stator core units are named as a first stator core unit, a second stator core unit, . . . , and a twelfth stator core unit which are connected to each other to form a circular structure comprising a cavity, and each stator core unit comprises a curved surface; twelve curved surfaces of the twelve stator core units are connected to each other to surround the cavity; the first coil-in pin is disposed on a first position of the first end insulator corresponding to the third stator core unit; the second coil-pin is disposed on a second position of the first end insulator corresponding to the fourth stator core unit; the third coil-in pin is disposed on a third position of the first end insulator corresponding to the fifth stator core unit; and the coil-out pin is disposed on a fourth position of the first end insulator corresponding to the tenth stator core unit.

In a class of this embodiment, the first end insulator comprises a first neck part comprising a first groove; the second end insulator comprises a second neck part provided with a second groove, a third groove, and a fourth groove; and the second groove, the third groove, and the fourth groove are sequentially disposed in a direction leaving the strip stator core.

In a class of this embodiment, the first groove is configured to receive the U-phase winding, the V-phase winding, and the W-phase winding; the second groove is configured to receive the V-phase winding and the W-phase winding; the third groove is configured to receive the V-phase winding; and the fourth groove is configured to receive the U-phase winding and the V-phase winding.

The disclosure also provides a method for winding coils around the stator assembly, the method comprising:

introducing the W-phase winding to the third coil-in pin on the fifth stator core unit and winding the W-phase winding on the third coil-in pin; continuing winding the W-phase winding on teeth of the fifth stator core unit, the sixth stator core unit, the eleventh stator core unit, and the twelfth stator core unit; and guiding the W-phase winding to the coil-out pin on the tenth stator core unit, winding the W-phase winding on the coil-out pin and leading out;

introducing the V-phase winding to the second coil-in pin on the fourth stator core unit and winding the V-phase winding on the second coil-in pin; continuing winding the V-phase winding on teeth of the third stator core unit, the fourth stator core unit, the ninth stator core unit, and the tenth stator core unit; and guiding the V-phase winding to the coil-out pin on the tenth stator core unit, winding the V-phase winding on the coil-out pin and leading out; and introducing the U-phase winding to the first coil-in pin on the fourth stator core unit and winding the U-phase winding on the first coil-in pin; continuing winding the U-phase winding on teeth of the first stator core unit, the second stator core unit, the seventh stator core unit, and the eighth stator core unit; and guiding the U-phase winding to the coil-out pin on the tenth stator core unit, winding the U-phase winding on the coil-out pin and leading out.

In a class of this embodiment, the U-phase winding, the V-phase winding, and the W-phase winding are first wound on two adjacent stator core units, then jump over next four stator core units, and are wound again on following two adjacent stator core units.

Specifically, the method for winding coils around the stator assembly comprises:

introducing the W-phase winding to the third coil-in pin on the fifth stator core unit, and winding the W-phase winding on the tooth of the fifth stator core unit; guiding the W-phase winding to the second groove on the second end insulator of the fifth stator core unit; guiding the W-phase winding from the second groove of the fifth stator core unit to the second end insulator of the sixth stator core unit; winding the W-phase winding on the tooth of the sixth stator core unit; guiding the W-phase winding to the second groove of the sixth stator core unit; allowing the W-phase winding to jump over the seventh stator core unit, the eighth stator core unit, the ninth stator core unit, and the tenth stator core unit, and winding the W-phase winding on the tooth of the eleventh stator core unit; winding the W-phase winding on the second groove of the second end insulator of the eleventh stator core unit; guiding the W-phase winding from the second groove to the tooth of the twelfth stator core unit and winding; guiding the W-phase winding to the first groove of the first end insulator of the twelfth stator core unit and winding; allowing the W-phase winding to jump over the eleventh stator core unit, and guiding the W-phase winding to the coil-out pin on the tenth stator core unit and leading out.

The method further comprises: introducing the V-phase winding to the second coil-in pin on the fourth stator core unit, and winding the V-phase winding on the first groove of the fourth stator core unit; guiding the V-phase winding from the first groove of the fourth stator core unit to the tooth of the third stator core unit and winding; guiding the V-phase winding from the second groove on the second end insulator of the third stator core unit to the tooth of the fourth stator core unit and winding; guiding the V-phase winding from the tooth of the fourth stator core unit to the third groove; allowing the V-phase winding to jump over the fifth stator core unit, the sixth stator core unit, the seventh stator core unit, and the eighth stator core unit, and winding the V-phase winding on the tooth of the ninth stator core unit; guiding the V-phase winding to the fourth groove of the second end insulator of the ninth stator core unit and winding; guiding the V-phase winding from the fourth groove to the tooth of the tenth stator core unit and winding; and guiding the V-phase winding to the coil-out pin on the tenth stator core unit and leading out.

The method still comprises: introducing the U-phase winding to the first coil-in pin on the third stator core unit, and winding the U-phase winding on the first groove of the third stator core unit; guiding the U-phase winding from the first groove of the third stator core unit to the tooth of the first stator core unit and winding; guiding the U-phase winding from the second groove on the second end insulator of the first stator core unit to the tooth of the second stator core unit and winding; guiding the U-phase winding from the tooth of the second stator core unit to the fourth groove; allowing the U-phase winding to jump over the third stator core unit, the fourth stator core unit, the fifth stator core unit, and the sixth stator core unit, and winding the U-phase winding on the tooth of the seventh stator core unit; guiding the U-phase winding to the fourth groove of the second end insulator of the seventh stator core unit and winding; guiding the U-phase winding from the fourth groove to the tooth of the eighth stator core unit and winding; winding the U-phase winding on the first groove of the first end insulator on the eighth stator core unit; allowing the U-phase winding to jump over the ninth stator core unit, and guiding to the coil-out pin on the tenth stator core unit and leading out.

The following advantages are associated with the stator assembly of the disclosure compared with the related art: the stator assembly comprises a first coil-in pin, a second coil-in pin, a third coil-in pin, and a coil-out pin. The coils of the three-phase coil winding are introduced to the stator assembly via the first coil-in pin, a second coil-in pin, and a third coil-in pin, respectively, and are guided out via the coil-out pin. This design is convenient for winding and prevents the intersections between the coils and turn-to-turn short circuit between phases.

DETAILED DESCRIPTION

Figure 1:
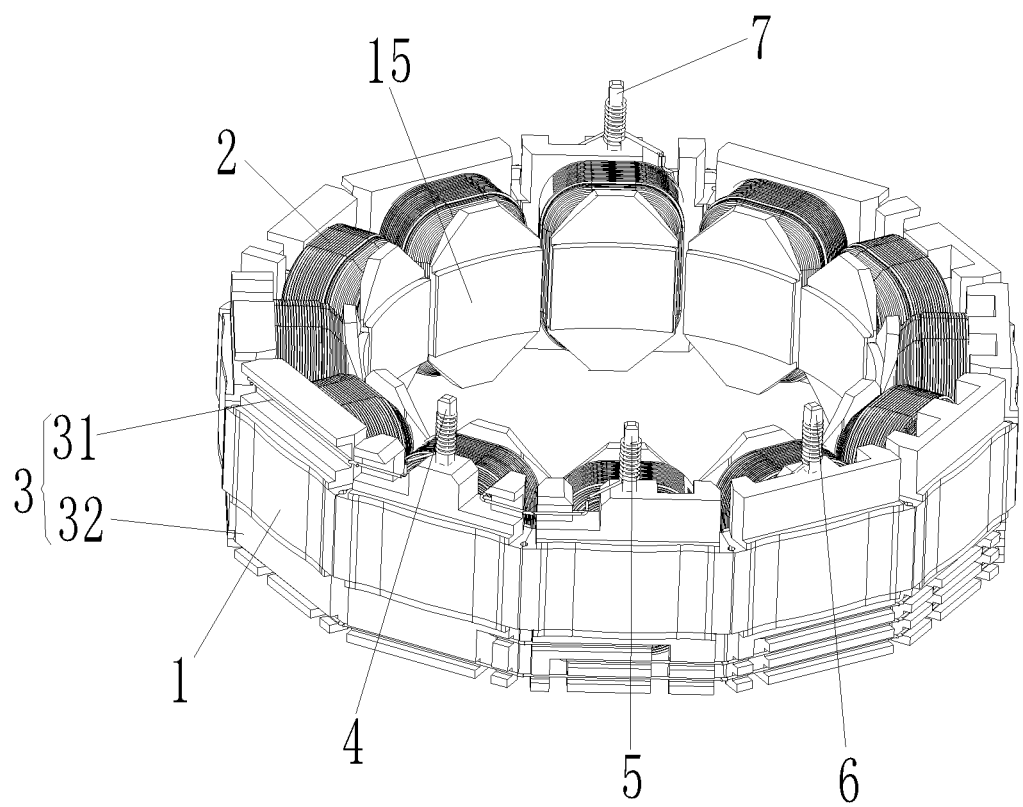
FIG. 1 is a schematic diagram of a stator assembly in accordance with one embodiment of the disclosure.
Figure 2:
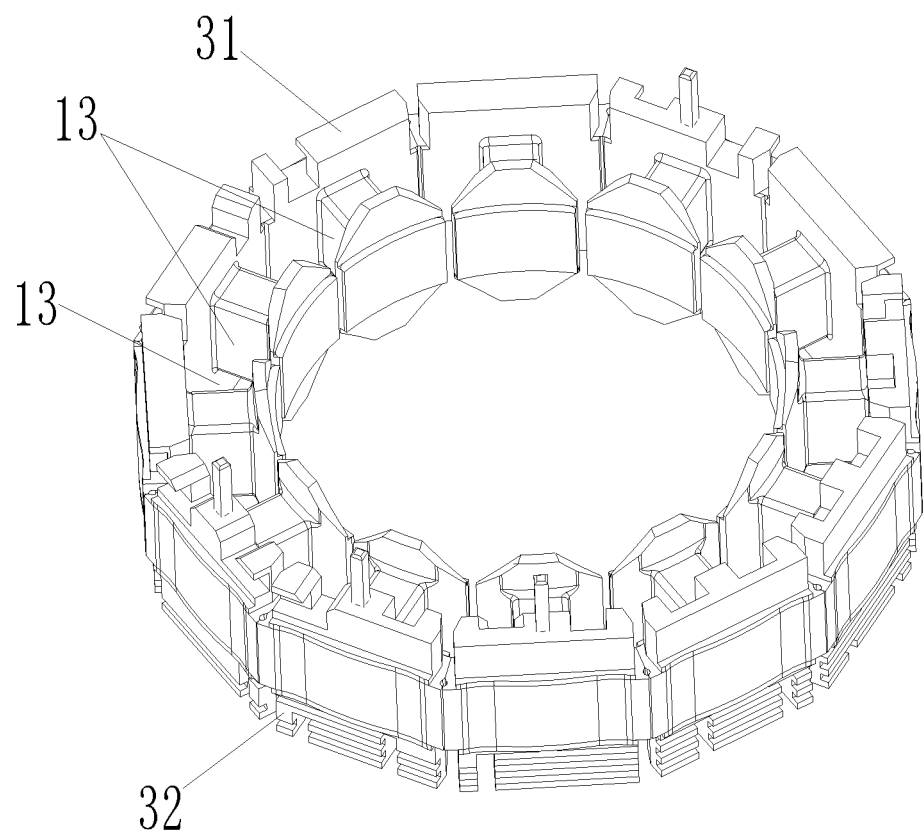
FIG. 2 is a schematic diagram of a stator assembly in accordance with one embodiment of the disclosure in another angle of view.
Figure 3:
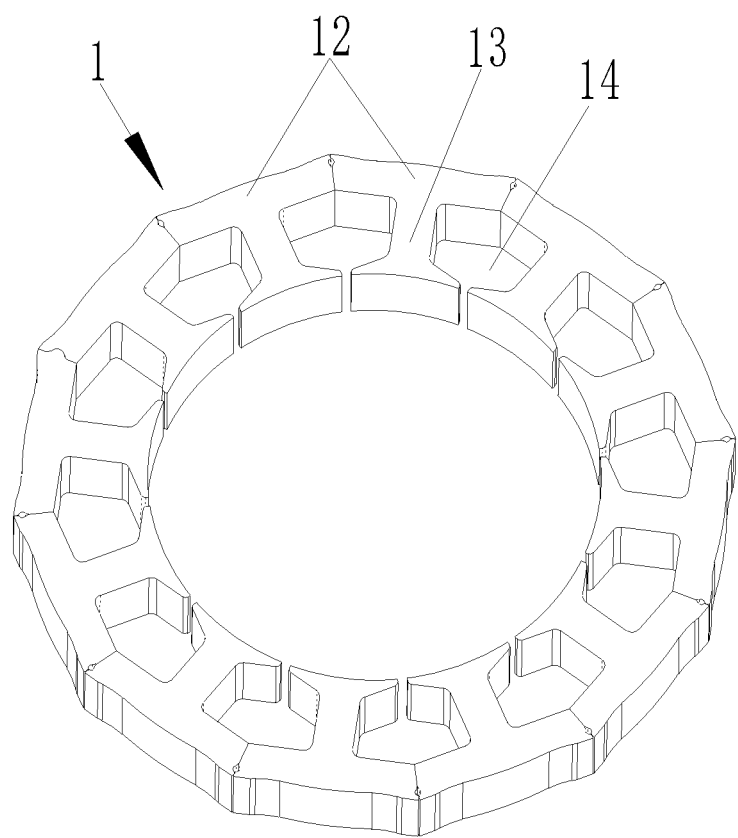
FIG. 3 is a schematic diagram of a strip stator core in accordance with one embodiment of the disclosure.
Figure 4:
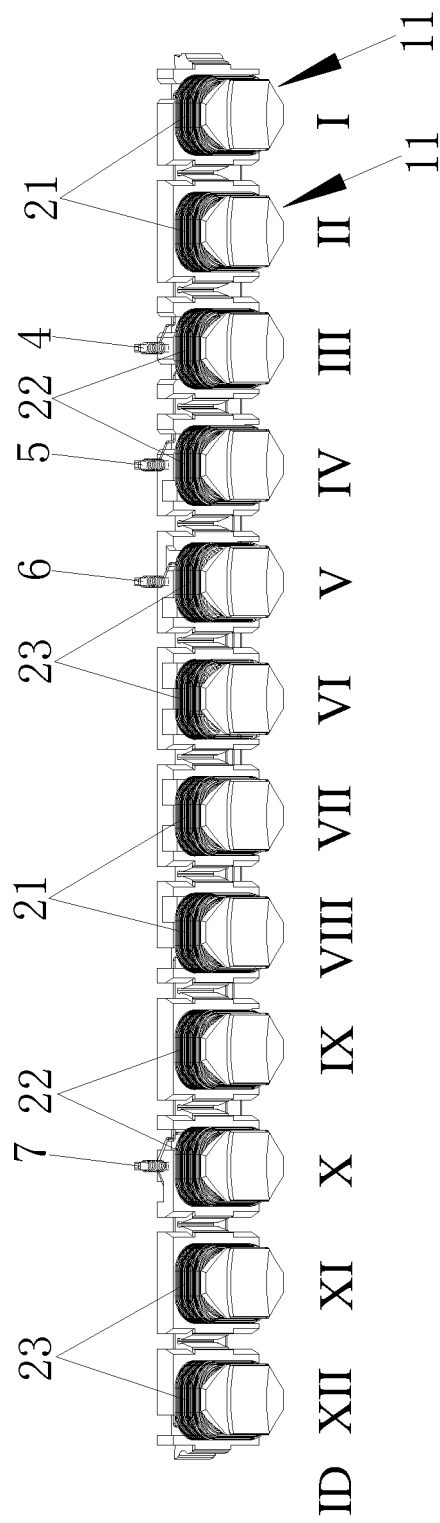
FIG. 4 is an unfolded view of a strip stator core comprising twelve stator core units in accordance with one embodiment of the disclosure.
Figure 5:
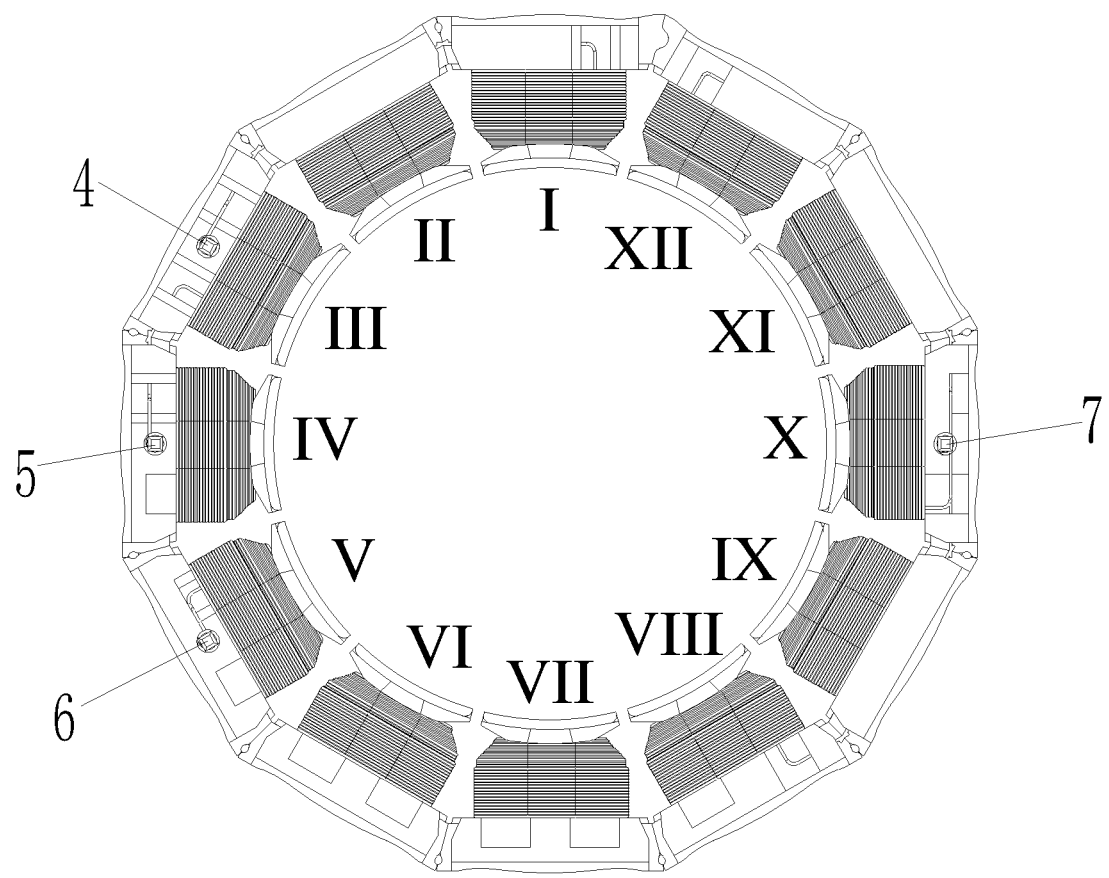
FIG. 5 is a top view of a strip stator core comprising twelve stator core units in accordance with one embodiment of the disclosure.
Figure 6:
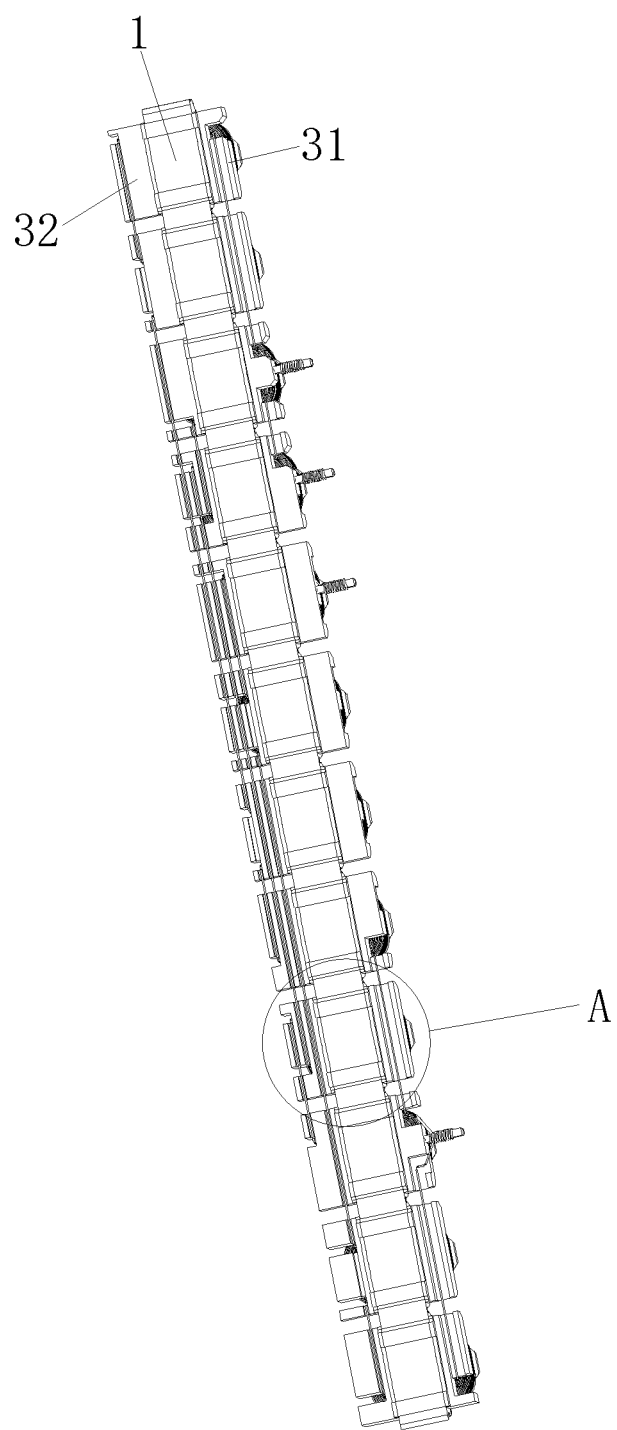
FIG. 6 is an unfolded view of a strip stator core comprising twelve stator core units in accordance with one embodiment of the disclosure in another angle of view.
Figure 7:
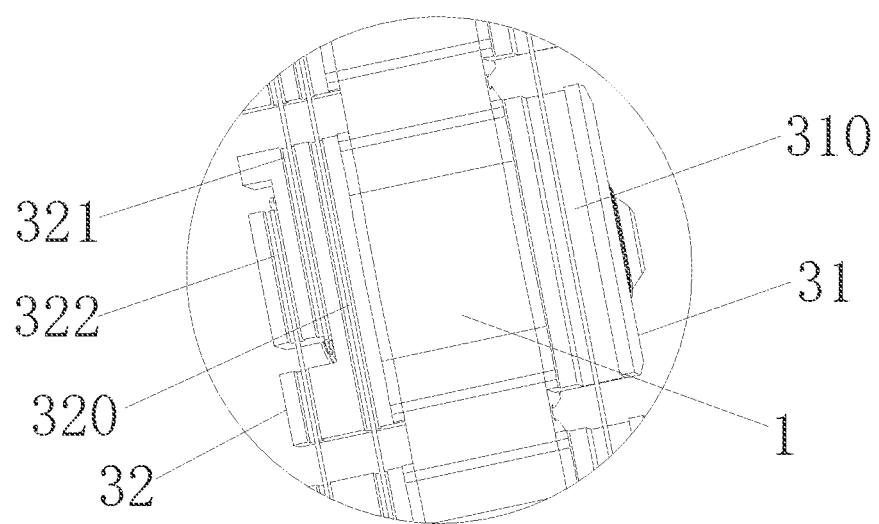
FIG. 7 is an enlarged view of part A in FIG. 6.

To further illustrate, embodiments detailing a stator assembly and a method for winding coils around the stator assembly are described below. It should be noted that the following embodiments are intended to describe and not to limit the disclosure.

Example 1

As shown in FIGS. 1-13, the disclosure provides a stator assembly comprising a strip stator core 1, a three-phase coil winding 2, and an end insulator 3. The strip stator core 1 comprises twelve stator core units 11, twelve connection parts, and twelve slots 14; every two adjacent stator core units are connected by one of the twelve connection parts; each slot is disposed between every two adjacent stator core units, and each stator core unit 11 comprises a yoke 12 and a tooth 13 protruding from one end of the yoke 12; every two adjacent yokes 12 and teeth 13 are abutted against each other to form one of the twelve slots 14. The three-phase coil winding 2 comprises a U-phase winding 21, a V-phase winding 22, and a W-phase winding 23. The end insulator comprises a first end insulator 31 and a second end insulator 32; the first end insulator 31 comprises a first coil-in pin 4, a second coil-in pin 5, a third coil-in pin 6, and a coil-out pin 7. The first end insulator 31 and the second end insulator 32 are secured to two end faces of the strip stator core 1, respectively. The three-phase coil winding 2 is wound on the strip stator core 1.

The U-phase winding 21, the V-phase winding 22, and the W-phase winding 23 are introduced to the strip stator core 1 via the first coil-in pin 4, the second coil-in pin 5, and the third coil-in pin 6, respectively, and leave the strip stator core 1 via the coil-out pin 7.

The twelve stator core units 11 are named as a first stator core unit, a second stator core unit, . . . , and a twelfth stator core unit which are connected to each other to form a circular structure comprising a cavity, and each stator core unit comprises a curved surface 15; twelve curved surfaces 15 of the twelve stator core units 11 are connected to each other to surround the cavity; the first coil-in pin 4 is disposed on a first position of the first end insulator 31 corresponding to the third stator core unit 11; the second coil-pin 5 is disposed on a second position of the first end insulator 31 corresponding to the fourth stator core unit 11; the third coil-in pin 6 is disposed on a third position of the first end insulator 31 corresponding to the fifth stator core unit 11; and the coil-out pin 7 is disposed on a fourth position of the first end insulator 31 corresponding to the tenth stator core unit 11.

The first end insulator 31 comprises a first neck part comprising a first groove 310; the second end insulator 32 comprises a second neck part provided with a second groove 320, a third groove 321, and a fourth groove 322; and the second groove 320, the third groove 321, and the fourth groove 322 are sequentially disposed in the direction leaving the strip stator core 1. The design is convenient for winding and prevents the intersections between three-phase windings and turn-to-turn short circuit between phases.

The first groove 310 is configured to receive the U-phase winding 21, the V-phase winding 22, and the W-phase winding 23; the second groove 320 is configured to receive the V-phase winding 22 and the W-phase winding 23; the third groove 321 is configured to receive the V-phase winding 22; and the fourth groove 322 is configured to receive the phase winding 21 and the V-phase winding 22. The design is convenient for winding and prevents the intersections between three-phase windings and turn-to-turn short circuit between phases.

Example 2

Provided is a method for winding coils around the stator assembly in Example 1, and the method comprises:

introducing the W-phase winding 23 to the third coil-in pin 6 on the fifth stator core unit 11 and winding the W-phase winding 23 on the third coil-in pin 6; continuing winding the W-phase winding 23 on teeth 13 of the fifth stator core unit, the sixth stator core unit, the eleventh stator core unit, and the twelfth stator core unit; and guiding the W-phase winding 23 to the coil-out pin 7 on the tenth stator core unit, winding the W-phase winding 23 on the coil-out pin 7 and leading out;

introducing the V-phase winding 22 to the second coil-in pin 5 on the fourth stator core unit 11 and winding the V-phase winding 22 on the second coil-in pin 5; continuing winding the V-phase winding 22 on teeth 13 of the third stator core unit, the fourth stator core unit, the ninth stator core unit, and the tenth stator core unit; and guiding the V-phase winding 22 to the coil-out pin 7 on the tenth stator core unit, winding the V-phase winding 22 on the coil-out pin 7 and leading out; and introducing the U-phase winding 21 to the first coil-in pin 4 on the fourth stator core unit 11 and winding the U-phase winding 21 on the first coil-in pin 4; continuing winding the U-phase winding 21 on teeth 13 of the first stator core unit, the second stator core unit, the seventh stator core unit, and the eighth stator core unit; and guiding the U-phase winding 21 to the coil-out pin 7 on the tenth stator core unit, winding the U-phase winding 21 on the coil-out pin 7 and leading out.

Figure 8:
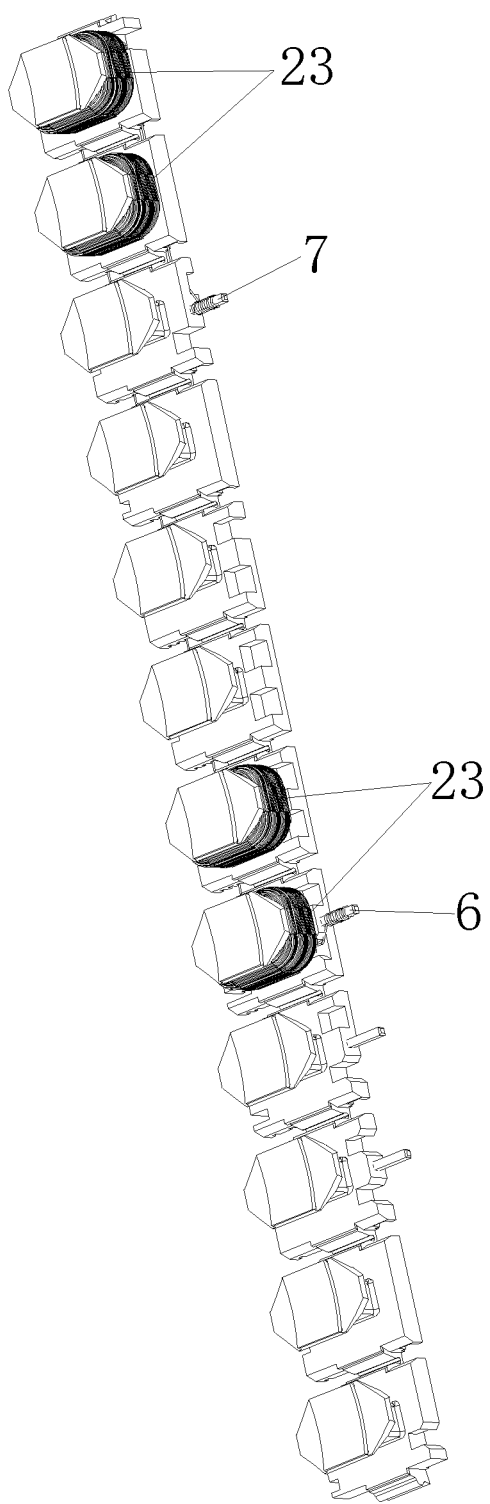
FIG. 8 shows a W-phase winding on a strip stator core comprising twelve stator core units in accordance with one embodiment of the disclosure.
Figure 9:
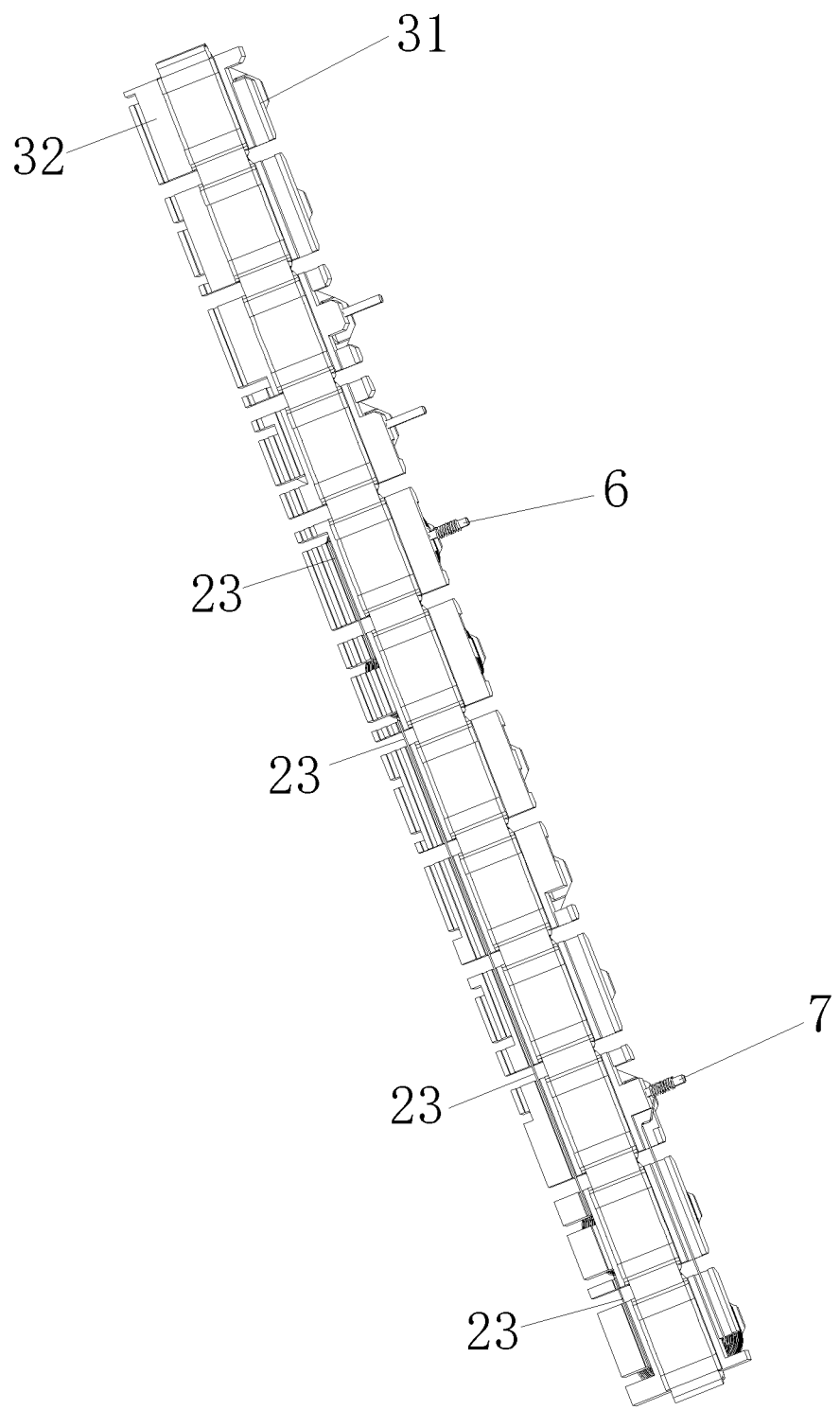
FIG. 9 shows a W-phase winding on a strip stator core comprising twelve stator core units in accordance with one embodiment of the disclosure in another angle of view.

Specifically, as shown in FIGS. 8-9, the W-phase winding 23 is wound as follows: introducing the W-phase winding 23 to the third coil-in pin 6 on the fifth stator core unit 11, and winding the W-phase winding 23 on the tooth of the fifth stator core unit; guiding the W-phase winding 23 to the second groove 320 on the second end insulator 32 of the fifth stator core unit 11; guiding the W-phase winding 23 from the second groove 320 of the fifth stator core unit 11 to the second end insulator 32 of the sixth stator core unit; winding the W-phase winding 23 on the tooth of the sixth stator core unit; guiding the W-phase winding 23 to the second groove 320 of the sixth stator core unit; allowing the W-phase winding to jump over the seventh stator core unit, the eighth stator core unit, the ninth stator core unit, and the tenth stator core unit, and winding the W-phase winding on the tooth 13 of the eleventh stator core unit; winding the W-phase winding on the second groove 320 of the second end insulator 32 of the eleventh stator core unit; guiding the W-phase winding from the second groove 320 to the tooth of the twelfth stator core unit and winding; guiding the W-phase winding to the first groove 310 of the first end insulator 31 of the twelfth stator core unit and winding; allowing the W-phase winding to jump over the eleventh stator core unit, and guiding the W-phase winding 23 to the coil-out pin 7 on the tenth stator core unit and leading out.

Figure 10:
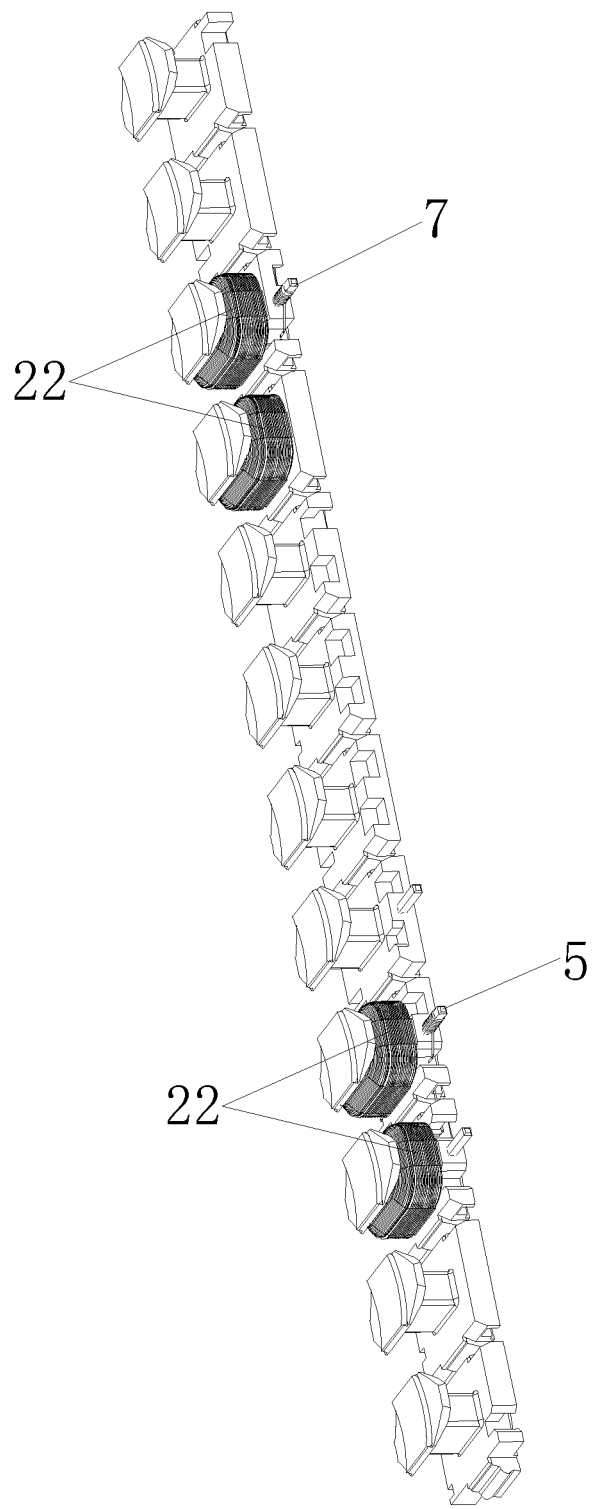
FIG. 10 shows a V-phase winding on a strip stator core comprising twelve stator core units in accordance with one embodiment of the disclosure.
Figure 11:
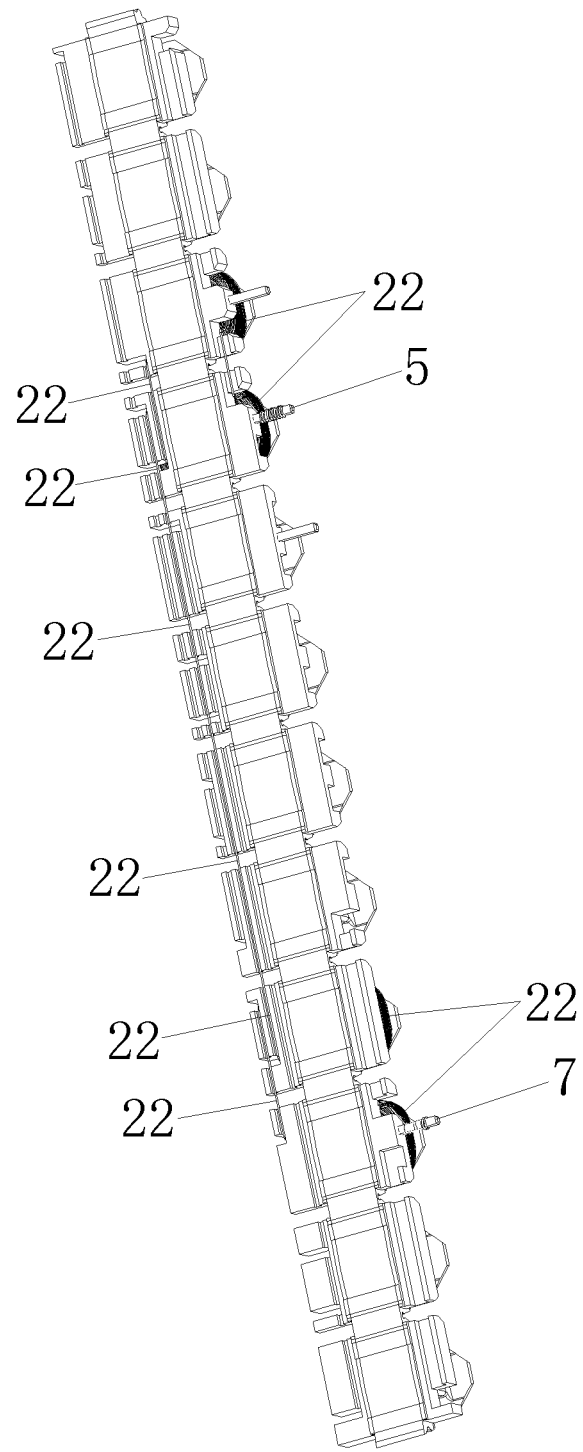
FIG. 11 shows a V-phase winding on a strip stator core comprising twelve stator core units in accordance with one embodiment of the disclosure in another angle of view.

As shown in FIGS. 10-11, the V-phase winding 23 is wound as follows: introducing the V-phase winding 22 to the second coil-in pin 5 on the fourth stator core unit 11, and winding the V-phase winding 22 on the first groove 310 of the fourth stator core unit; guiding the V-phase winding 22 from the first groove 310 of the fourth stator core unit to the tooth of the third stator core unit 11 and winding; guiding the V-phase winding 22 from the second groove 320 on the second end insulator 32 of the third stator core unit 11 to the tooth of the fourth stator core unit 11 and winding; guiding the V-phase winding 22 from the tooth of the fourth stator core unit 11 to the third groove 321; allowing the V-phase winding to jump over the fifth stator core unit, the sixth stator core unit, the seventh stator core unit, and the eighth stator core unit, and winding the V-phase winding on the tooth 13 of the ninth stator core unit; guiding the V-phase winding to the fourth groove 322 of the second end insulator 32 of the ninth stator core unit and winding; guiding the V-phase winding from the fourth groove 322 to the tooth of the tenth stator core unit 11 and winding; and guiding the V-phase winding to the coil-out pin 7 on the tenth stator core unit and leading out.

Figure 12:
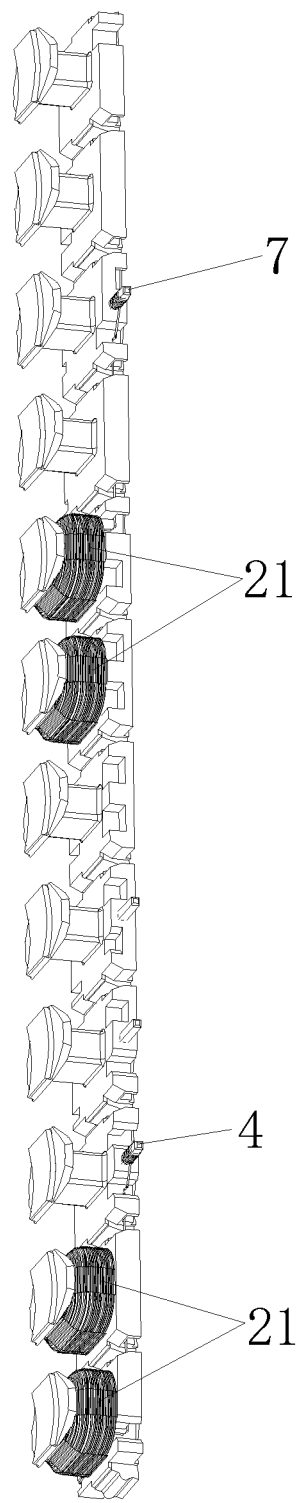
FIG. 12 shows a U-phase winding on a strip stator core comprising twelve stator core units in accordance with one embodiment of the disclosure.
Figure 13:
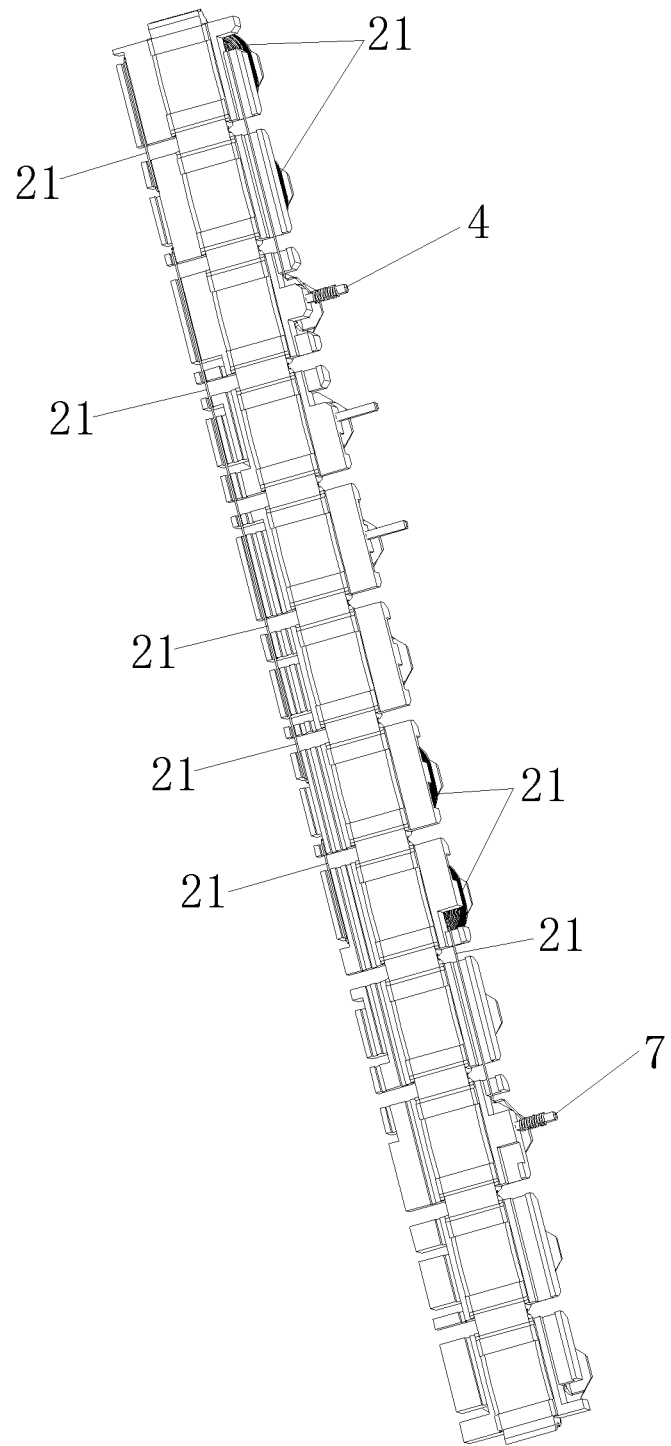
FIG. 13 shows a U-phase winding on a strip stator core comprising twelve stator core units in accordance with one embodiment of the disclosure in another angle of view.

As shown in FIGS. 12-13, the U-phase winding 23 is wound as follows: introducing the U-phase winding 21 to the first coil-in pin 4 on the third stator core unit 11, and winding the U-phase winding 21 on the first groove 310 of the third stator core unit; guiding the U-phase winding 21 from the first groove 310 of the third stator core unit to the tooth of the first stator core unit 11 and winding; guiding the U-phase winding 21 from the second groove 320 on the second end insulator 32 of the first stator core unit 11 to the tooth of the second stator core unit 11 and winding; guiding the U-phase winding 21 from the tooth of the second stator core unit 11 to the fourth groove 322; allowing the U-phase winding to jump over the third stator core unit, the fourth stator core unit, the fifth stator core unit, and the sixth stator core unit, and winding the U-phase winding on the tooth 13 of the seventh stator core unit; guiding the U-phase winding 21 to the fourth groove 322 of the second end insulator 32 of the seventh stator core unit and winding; guiding the U-phase winding from the fourth groove 322 to the tooth of the eighth stator core unit 11 and winding; winding the U-phase winding on the first groove 310 of the first end insulator 31 on the eighth stator core unit; allowing the U-phase winding to jump over the ninth stator core unit, and guiding to the coil-out pin 7 on the tenth stator core unit and leading out.

Specifically, the U-phase winding 21, the V-phase winding 22, and the W-phase winding 23 are first wound on two adjacent stator core units 11, then jump over next four stator core units, and are wound again on following two adjacent stator core units 11.

It will be obvious to those skilled in the art that changes and modifications may be made, and therefore, the aim in the appended claims is to cover all such changes and modifications.

What is claimed is:

1. A stator assembly, comprising:
a strip stator core comprising twelve stator core units, twelve connection parts, and twelve slots; every two adjacent stator core units being connected by one of the twelve connection parts; each slot being disposed between every two adjacent stator core units, and each stator core unit comprising a yoke and a tooth protruding from one end of the yoke; every two adjacent teeth being abutted against each other to form the twelve slots, respectively;
a three-phase coil winding, the three-phase coil winding comprising a U-phase winding, a V-phase winding, and a W-phase winding;
an end insulator, the end insulator comprising a first end insulator and a second end insulator; the first end insulator comprising a first coil-in pin, a second coil-in pin, a third coil-in pin, and a coil-out pin;
wherein:
the first end insulator and the second end insulator are secured to two end faces of the strip stator core, respectively;
the three-phase coil winding is wound on the strip stator core;
the U-phase winding, the V-phase winding, and the W-phase winding are introduced to the strip stator core via the first coil-in pin, the second coil-in pin, and the third coil-in pin, respectively, and leave the strip stator core via the coil-out pin; and
the twelve stator core units are connected to each other to form a circular structure comprising a cavity, and each stator core unit comprises a curved surface; twelve curved surfaces of the twelve stator core units are connected to each other to surround the cavity; the first coil-in pin is disposed on a first position of the first end insulator corresponding to the third stator core unit; the second coil-pin is disposed on a second position of the first end insulator corresponding to the fourth stator core unit; the third coil-in pin is disposed on a third position of the first end insulator corresponding to the fifth stator core unit;
and the coil-out pin is disposed on a fourth position of the first end insulator corresponding to the tenth stator core unit.

2. The stator assembly of claim 1, wherein the first end insulator comprises a first neck part comprising a first groove; the second end insulator comprises a second neck part provided with a second groove, a third groove, and a fourth groove; and the second groove, the third groove, and the fourth groove are sequentially disposed in a direction leaving the strip stator core.

3. The stator assembly of claim 2, wherein the first groove is configured to receive the U-phase winding, the V-phase winding, and the W-phase winding; the second groove is configured to receive the V-phase winding and the W-phase winding; the third groove is configured to receive the V-phase winding; and the fourth groove is configured to receive the U-phase winding and the V-phase winding.

4. A method for winding coils around the stator assembly of claim 2, the method comprising:
introducing the W-phase winding to the third coil-in pin on the fifth stator core unit, and winding the W-phase winding on the tooth of the fifth stator core unit; guiding the W-phase winding to the second groove on the second end insulator of the fifth stator core unit; guiding the W-phase winding from the second groove of the fifth stator core unit to the second end insulator of the sixth stator core unit; winding the W-phase winding on the tooth of the sixth stator core unit; guiding the W-phase winding to the second groove of the sixth stator core unit; allowing the W-phase winding to jump over the seventh stator core unit, the eighth stator core unit, the ninth stator core unit, and the tenth stator core unit, and winding the W-phase winding on the tooth of the eleventh stator core unit; winding the W-phase winding on the second groove of the second end insulator of the eleventh stator core unit; guiding the W-phase winding from the second groove to the tooth of the twelfth stator core unit and winding; guiding the W-phase winding to the first groove of the first end insulator of the twelfth stator core unit and winding; allowing the W-phase winding to jump over the eleventh stator core unit, and guiding the W-phase winding to the coil-out pin on the tenth stator core unit and leading out.

5. The method of claim 4, further comprising: introducing the V-phase winding to the second coil-in pin on the fourth stator core unit, and winding the V-phase winding on the first groove of the fourth stator core unit; guiding the V-phase winding from the first groove of the fourth stator core unit to the tooth of the third stator core unit and winding; guiding the V-phase winding from the second groove on the second end insulator of the third stator core unit to the tooth of the fourth stator core unit and winding; guiding the V-phase winding from the tooth of the fourth stator core unit to the third groove; allowing the V-phase winding to jump over the fifth stator core unit, the sixth stator core unit, the seventh stator core unit, and the eighth stator core unit, and winding the V-phase winding on the tooth of the ninth stator core unit; guiding the V-phase winding to the fourth groove of the second end insulator of the ninth stator core unit and winding; guiding the V-phase winding from the fourth groove to the tooth of the tenth stator core unit and winding; and guiding the V-phase winding to the coil-out pin on the tenth stator core unit and leading out.

6. The method of claim 5, further comprising: introducing the U-phase winding to the first coil-in pin on the third stator core unit, and winding the U-phase winding on the first groove of the third stator core unit; guiding the U-phase winding from the first groove of the third stator core unit to the tooth of the first stator core unit and winding; guiding the U-phase winding from the second groove on the second end insulator of the first stator core unit to the tooth of the second stator core unit and winding; guiding the U-phase winding from the tooth of the second stator core unit to the fourth groove; allowing the U-phase winding to jump over the third stator core unit, the fourth stator core unit, the fifth stator core unit, and the sixth stator core unit, and winding the U-phase winding on the tooth of the seventh stator core unit; guiding the U-phase winding to the fourth groove of the second end insulator of the seventh stator core unit and winding; guiding the U-phase winding from the fourth groove to the tooth of the eighth stator core unit and winding; winding the U-phase winding on the first groove of the first end insulator on the eighth stator core unit; allowing the U-phase winding to jump over the ninth stator core unit, and guiding to the coil-out pin on the tenth stator core unit and leading out.

7. A method for winding coils around the stator assembly of claim 1, the method comprising:

introducing the W-phase winding to the third coil-in pin on the fifth stator core unit and winding the W-phase winding on the third coil-in pin; continuing winding the W-phase winding on teeth of the fifth stator core unit, the sixth stator core unit, the eleventh stator core unit, and the twelfth stator core unit; and guiding the W-phase winding to the coil-out pin on the tenth stator core unit, winding the W-phase winding on the coil-out pin and leading out;

introducing the V-phase winding to the second coil-in pin on the fourth stator core unit and winding the V-phase winding on the second coil-in pin; continuing winding the V-phase winding on teeth of the third stator core unit, the fourth stator core unit, the ninth stator core unit, and the tenth stator core unit; and guiding the V-phase winding to the coil-out pin on the tenth stator core unit, winding the V-phase winding on the coil-out pin and leading out; and introducing the U-phase winding to the first coil-in pin on the fourth stator core unit and winding the U-phase winding on the first coil-in pin; continuing winding the U-phase winding on teeth of the first stator core unit, the second stator core unit, the seventh stator core unit, and the eighth stator core unit; and guiding the U-phase winding to the coil-out pin on the tenth stator core unit, winding the U-phase winding on the coil-out pin and leading out.

8. The method of claim 7, wherein the U-phase winding, the V-phase winding, and the W-phase winding are first wound on two adjacent stator core units, then jump over next four stator core units, and are wound again on following two adjacent stator core units.

\* \* \* \* \*